(12) United States Patent
Edwards

(10) Patent No.: US 7,977,635 B2
(45) Date of Patent: Jul. 12, 2011

(54) RADIANT ENERGY IMAGER USING NULL SWITCHING

(76) Inventor: Oliver Edwards, Occee, FL (US)

( * ) Notice: Subject to any disclaimer, the term of this patent is extended or adjusted under 35 U.S.C. 154(b) by 237 days.

(21) Appl. No.: 12/189,134

(22) Filed: Aug. 8, 2008

(65) Prior Publication Data

US 2011/0089324 A1 Apr. 21, 2011

(51) Int. Cl.
*G01J 5/10* (2006.01)
(52) U.S. Cl. .................................... 250/338.1
(58) Field of Classification Search .............. 250/332, 250/336.1, 338.1, 338.3; 438/52
See application file for complete search history.

(56) References Cited

U.S. PATENT DOCUMENTS

| | | | |
|---|---|---|---|
| 5,471,515 A | 11/1995 | Fossum et al. | |
| 5,623,147 A | 4/1997 | Baert et al. | |
| 5,844,238 A | 12/1998 | Sauer et al. | |
| 6,140,646 A | 10/2000 | Busta et al. | |
| 6,420,706 B1* | 7/2002 | Lurie et al. | 250/338.1 |
| 6,876,482 B2* | 4/2005 | DeReus | 359/290 |
| 7,116,462 B2* | 10/2006 | Ikeda | 359/291 |
| 2003/0116417 A1* | 6/2003 | DeReus | 200/181 |
| 2007/0024951 A1* | 2/2007 | Mochizuki et al. | 359/291 |
| 2007/0074569 A1* | 4/2007 | Engler et al. | 73/335.02 |

* cited by examiner

*Primary Examiner* — David P Porta
*Assistant Examiner* — Mark R Gaworecki
(74) *Attorney, Agent, or Firm* — Carr & Ferrell LLP

(57) ABSTRACT

In some aspects, the present invention embodies both the method and apparatus for converting a pattern of irradiation to a visible image. An embodiment of the present invention provides an array of micro-electro-mechanical sensors with each sensor includes a deflectable micro-cantilever, responsive to absorbed incident radiation and to an applied repulsive electrostatic field. In an aspect, the sensor device also includes a null-sensing circuit coupled to a switch contact on or near the substrate, which senses when the micro-cantilever reaches its null location, by electrical connection with an upper switch contact on the micro-cantilever. Other embodiments are also described.

80 Claims, 6 Drawing Sheets

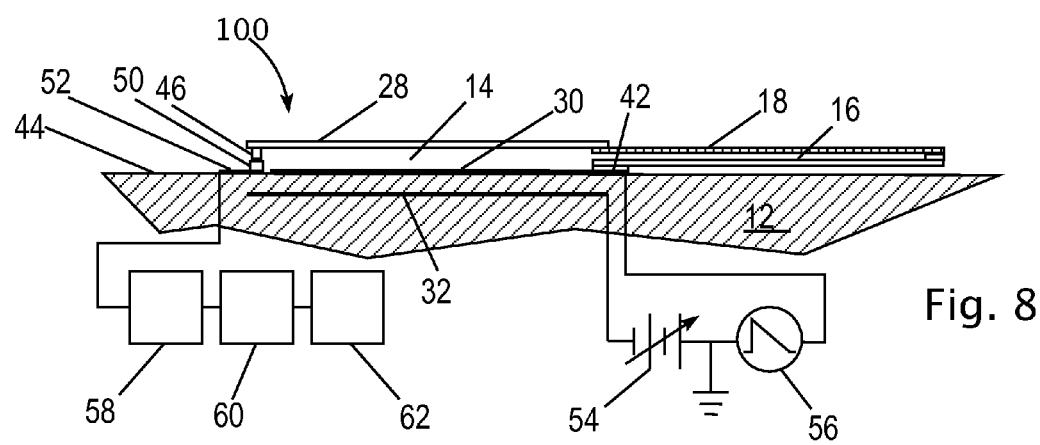
Fig. 8
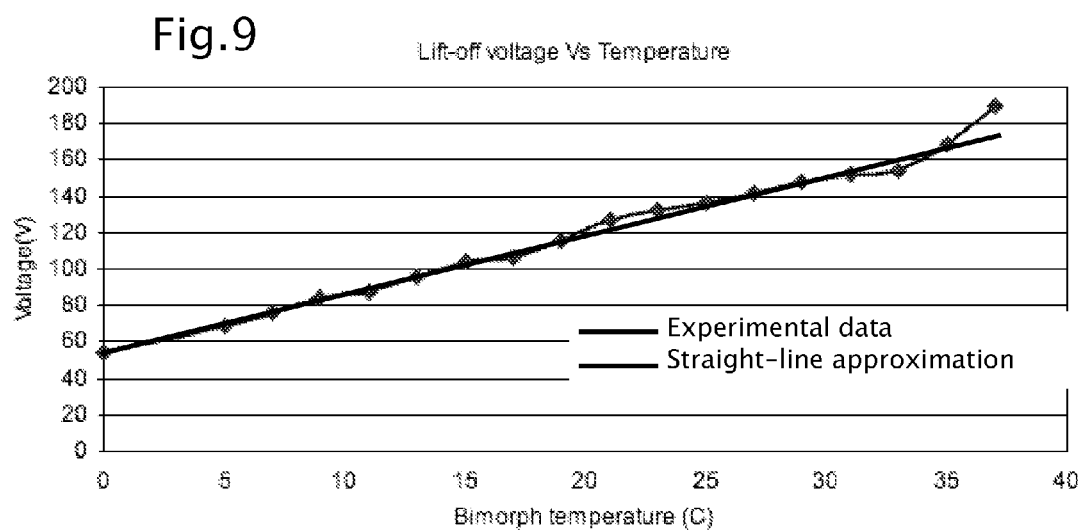

RADIANT ENERGY IMAGER USING NULL SWITCHING

FIELD OF THE INVENTION

This invention relates to radiant energy imaging sensors, and, in particular to such methods, systems, apparatus and devices for sensors as employ a micro-cantilever as a responsive element.

BACKGROUND AND PRIOR ART

A variety of prior art irradiance sensors is currently available in the electronics industry. Techniques for converting radiation to visible images are also known in which the absorbed radiant energy is converted to heat to change a measurable property of a sensing element, such as the resistance of a resistor or the position of a bi-material cantilever. The sensed radiation includes ultraviolet, visible, infra-red, or terahertz irradiation, depending on the spectral absorption of the sensor element.

An example of a prior art radiation sensor is the deflectable micro-electromechanical (MEM) cantilever bi-material device formed of a bi-material, anchored on an insulating substrate. The bi-material portion of the micro-cantilever device is formed of two different materials sharing a common surface and having different coefficients of thermal expansion (CTE). Examples of bi-material MEM micro-cantilever devices and methods for forming the same are disclosed in U.S. Pat. No. 5,844,238 issued to Sauer et al. and U.S. Pat. Nos. 6,140,646 and 6,420,706 issued to Lurie et al.

The prior art bi-material MEM micro-cantilever devices bend, or deflect, when irradiation is absorbed by an absorber element of the micro-cantilever and heats the bi-material section of the micro-cantilever, causing one of the bi-materials to expand at a greater rate than the other bi-material and resulting in deflection or bending of the micro-cantilever. The terms bend and deflect are hereinafter used interchangeably. An example of a prior art micro-cantilever is shown in FIGS. 1 and 2.

FIG. 1 is a cross sectional view showing a prior art micro-cantilever 10. As shown, the micro-cantilever 10 is suspended over the substrate 12. Area 14 forms the opening between the substrate 12 and the micro-cantilever 10. The micro-cantilever 10 includes a thermal isolation region 16, a bi-material region 18 and an absorbing region 20. Within the absorbing region 20, the absorber material 22 helps absorb radiation which is incident on the micro-cantilever structure. In the bi-material region 18, a first bi-material film 24 and a second bi-material 26 are present. Bi-material films 24 and 26 are contiguous and have different coefficients of thermal expansion.

When radiation is incident upon the MEM structure, the micro-cantilever 10 is heated and bends because the two bi-material films 24 and 26 expand at different rates. FIG. 1 shows micro-cantilever 10 in an original position when the micro-cantilever is not exposed to radiation.

FIG. 2 shows the micro-cantilever structure of FIG. 1 in a deflected or bent position; in this case, away from the substrate 12. The distance H indicates the deflection of the tip of the micro-cantilever, from the original position. A variety of apparatuses and methods is available in the art to provide a visual image having an intensity that varies according to the degree of the deflection H of the micro-cantilever structure 100. More generally, various apparatuses and methods are available for providing optical imaging having an intensity which is determined by the amount of radiation sensed by a radiation sensor.

When radiation is incident on a prior art micro-cantilever being used as an image sensor, it is desired to produce a visible image having an intensity which varies monotonically with the intensity of the incident radiation, over a wide dynamic range. As a micro-cantilever device bends in response to incident radiation, it approaches a physical limitation to its degree of bending. For example, if a micro-cantilever device is fabricated to bend freely downward in response to incident radiation, the physical limitation is reached when the micro-cantilever touches the substrate over which it is formed. For a micro-cantilever device chosen to bend upward in response to incident radiation, this too will reach a physical limitation point past which it can no longer bend as a bi-material. When this point of the physical limitation of bending is approached, the micro-cantilever device is more resistant to bending and therefore, less responsive to additional radiation. An increase in the amount of incident radiation does not cause the same extent of bending as when the micro-cantilever is in the rest position.

While a significantly higher dose of radiation forces the micro-cantilever to bend slightly more towards its physical limitation, the degree of bending is not proportional and the device response is not linear in this region. As a result, the linear range of the device is limited. The relationship between deflection H and the temperature of the micro-cantilever 10 is limited to the linear region.

Moreover, after the physical limitation point is reached, additional incident radiation does not cause any further bending which limits the dynamic range of the device. Since the intensity of an optical image ultimately produced is based on the degree of bending, prior art devices have a poor dynamic range and are limited linearity, results in producing an image having the same shortcomings.

Various methods for sensing the degree of free bending are available in the art. Examples include optically measuring the distance between the micro-cantilever and the substrate, measuring the movement of an optical beam reflected from the tilting cantilever surface, or electrically measuring the capacitance of a capacitor which includes an electrode formed in the substrate and another electrode formed in the micro-cantilever above the substrate. Various methods for producing a visible image having an intensity based upon the extent of bending are also known.

A method for forming a micro-cantilever device is disclosed in U.S. Pat. No. 5,844,238 issued to Saur which describes an infrared imager using room temperature capacitance sensors. The infrared imager includes an array of capacitance sensors that operate at room temperature and each infrared capacitance sensor includes a deflectable plate which bends in response to absorbed thermal radiation relative to a non-deflectable second plate. In one embodiment each infrared capacitance sensor is composed of a bi-material strip which changes the position of one plate of a sensing capacitor in response to temperature changes due to absorbed incident thermal radiation.

Other prior art includes various configurations of physical micro-cantilever or other MEM structures. For examples, FIGS. 3 and 4 show two embodiments of MEM structures which move in response to incident radiation. Each of the structures shown in FIGS. 3 and 4 include rigid thermal isolation arms 16, bendable bi-material arms 18 and an absorber area 20. It can be understood that, in addition to the exemplar structures shown in FIGS. 1-4, various other configurations for MEMs structures which bend or deflect in response to incident radiation are well known to those skilled in the art.

Improvements have been made to increase the dynamic range and linearity of the radiation sensors using bi-material MEMs structures available in the art, by providing a radiation sensor using nulling circuitry along with a micro-cantilever structure, as disclosed in U.S. Pat. No. 6,420,706 issued to Lurie which describes optical detectors using nulling for high linearity and large dynamic range. The natural bending of the bi-material is resisted by an electronic feedback signal to retain the absorber plate at a nulling position; thus the feedback signal is a measure of the bi-material temperature, and hence the irradiance. Examples taught for feedback signals include a piezoelectric element to add a commanded stress to the micro-cantilever, a heater element to add a commanded heat load to the micro-cantilever, or inducement of an attractive electrostatic charge between the micro-cantilever and the substrate. Within the limits of the effectiveness of the feedback signal to return the micro-cantilever to null position, the linear range may be extended.

By their very function, bolometers are very sensitive thermometers, measuring differences in absorber plate temperature of the order of hundredths of a degree. Moreover they possess a limited range of linear response to irradiative heating. Thus, present-art bolometers typically require addition of a thermoelectric refrigerator/heater to stabilize the base temperature of the device. Aside from its cost and bulk, the disadvantage is that power consumed by this thermoelectric refrigerator/heater is typically the single largest power drain in the imaging system.

All of the above mentioned methods depend on various forms of analog measurement, with the many associated sources of noise in the analog signal. Typically the noise sources in a cantilever bolometer include thermomechanical noise in the cantilever plate and the generally much larger electronic noise sources attendant on the analog nature of the measurement: 1/f noise, shot noise, Johnson or resistor noise, and amplifier noise. Typically the sum of these noise components has been five to twenty times greater than the noise in the background radiation itself.

Another limit of prior art configurations has been the degree to which the bi-material bends for a given absorbed irradiance. It is desirable that the bi-material bend maximally for a given irradiance. However, this desirable bending has been limited in prior art by the choices of bi-material materials and bi-material design such as the difference in thermal expansion between the expansive bi-materials, the high thermal conductivity of the thermal isolating leg, and the stiffness of the cantilever support legs. The responsiveness of conventional micro-cantilevers is typically of the order of 0.04 microns per degree C., with a maximum known MEMS bi-material responsiveness of $0.25\mu/^\circ$ C. and is limited by three issues.

First, the prior art choice of bi-material materials has been limited to aluminum or gold as the expansive material, and silicon nitride as the relatively non-expansive material.

Second, the bending has been limited by a necessity to achieve rapid thermal stabilization of the temperature of the absorber plate and bi-material within a fraction of a video frame period, so that the bi-material bending can be measured before the end of the frame. This has typically required a thermal time constant of less than 10 milliseconds for a 30 Hz video frame rate, and preferably 2.5 milliseconds for a 60 Hz frame rate. The time constant of the cantilever is inversely proportional to the thermal conductance of the insulator leg, necessitating the latter to be relatively large. Thus, for a given irradiance the maximal bi-material temperature which is proportional to the thermal time constant, is decreased. Thus the measurement signal is decreased and the frame rate is limited to a low value.

Third, a limit of prior teaching has been the mechanical resonance of the cantilever itself because the support leg, which includes the insulator leg plus bi-material, must be made stiff enough that the freely supported mass of the absorber plate has a resonant frequency higher than that of ambient acoustic fields, typically higher than 20,000 Hz. Were the mechanical resonance 2000 Hz, for example, a violin note or a whistle could destroy the signal or the micro-cantilever itself. Consequently the coated absorber mass must be made small to the limits of practicality and the bi-material and insulator legs must be made relatively stiff and unresponsive.

Yet another limit of prior art bolometers is their necessity to "blink" frequently with the display periodically going visibly black, using a mechanical shutter to remove the target irradiance from the array and zero out all the various readings of the bolometer sensors as they slowly drift in base temperature. This is occasioned by the limited irradiance range of the bolometer: essentially all of the dynamic range of the bolometer is required for constructing the final image.

An A/C coupled thermal imaging system has a signal that is centered around the "local average temperature" without an offset or pedestal which occurs independently across the array. Because of this, the device only has to deal with the smaller A/C signal and it therefore has the capability of handling substantially greater temperature variations in the scene. However, if the scene does not change, there is no A/C component to the signal itself. Therefore A/C-coupled systems employ a mechanical chopper, with the attendant issues of weight, power, life time and delicacy as to mechanical shock.

A DC coupled thermal imaging system measures a tiny signal on top of a large DC background signal, which is a primary cause for noise limitation in the minimum discernable signal. The DC-coupled thermal imaging system must handle the relatively very large offset as well as the signal of interest This complicates the system because the offsets differ from pixel to pixel, and the differences vary slowly with time, increasing spatial noise in the system. As a result, DC-coupled systems also employ a mechanical shutter to periodically re-calibrate the scene and minimize spatial noise. Both A/C and DC-coupled systems perform a similar comparative function by periodically shuttering the system at some time interval from a few seconds to a few minutes, usually resulting in an interruptive image freeze upon shuttering.

As described above in detail, the prior art micro-cantilever radiation sensors suffer from a number of disadvantages including:

(a) Because the temperature of the sensor element must reach a stable level before measurement may be made, the thermal time constant of the micro-cantilever must be made a fraction of the frame time. As a result the thermal conductance of the thermal insulator leg must be large, the temperature rise for a given irradiance is less and the bend of the responsive bi-material is decreased.

(b) Because in the past the use of aluminum or gold for the expansive material and silicon or silicon nitride for the less-expansive material, the difference in thermal expansion has been limited and the bend of the bi-material is decreased.

(c) Because the mechanical resonance of the micro-cantilever must be higher than ambient acoustic frequencies, the bi-material leg must be made stiff, and the bend of the bi-material is in response to irradiance is decreased.

(d) In past micro-cantilever bolometers the measure of irradiance is an analog signal, with the attendant 1/f, shot, Johnson, and amplifier noise, which together increase the irradiance required to exceed the noise of the sensor.

(e) As a result of the noise and insensitivity, bolometers have required the longest exposure possible to reach a stable temperature for measurement within the limited frame time, and thus have a limited ability to operate at a higher frame rate.

(f) Because of the need for stabilization of the substrate temperature, use of a costly and power-draining thermoelectric temperature regulator has been common.

(g) The linear measurements of past micro-cantilever bolometers are typically exhibited on an 8-bit gray scale display, limiting their linearly displayable upper irradiance to 256 times the least resolved display increment.

Thus, there is a need for an imaging sensor which operates by measuring absorbed power as heat regardless of the wavelength of the irradiance to provide a thermal-type irradiance imaging array, having improved range in target radiance and decreased sensor noise, and not requiring the use of thermoelectric temperature stabilization.

SUMMARY OF THE INVENTION

A primary objective of the invention is to provide methods, apparatus and systems for a thermal-type irradiance imaging array capable of lower internal noise and greater dynamic range; requiring neither periodic shuttering nor an internal refrigerator/heater; and measuring irradiance with low noise over many orders of magnitude.

A second objective of the invention is to provide methods, apparatus and systems for a radiant imager using null switching to provide an improved irradiance sensor having all-digital sensing and measurement.

A third objective of the invention is to provide methods, apparatus and systems for a radiant imager using electrostatic compensation to provide an imager having no requirement for the cost, bulk and power drain of a thermoelectric temperature regulator.

A fourth objective of the invention is to provide methods, apparatus and systems for a radiant imager using null switching to provide an improved imager which can measure irradiance over a very wide dynamic range in a single image, such as from objects at temperatures from a fraction of a degree to thousands of degrees above ambient.

A fifth objective of the invention is to provide methods, apparatus and systems for a radiant imager using null switching to provide an improved irradiance sensor which can record image radiance in a pseudo-logarithmic scale, such that the measurement scale is compressed for high radiance and expanded for low radiance.

A sixth objective of the invention is to provide methods, apparatus and systems for a radiant imager using null switching to provide an imager having a noise-equivalent irradiance which varies with source radiance, such that the measurement noise is a small fraction of the signals from both least radiant targets and most radiant targets.

A seventh objective of the invention is to provide methods, apparatus and systems for a radiant imager using null switching to provide an imager which is relatively insensitive to shock and acoustic vibrations.

An eighth objective of the invention is to provide methods, apparatus and systems for a radiant imager using null switching to provide an imager which can provide continual imagery, without the interruption or disturbance of mechanical shuttering.

A ninth objective of the invention is to provide methods, apparatus and systems for a radiant imager using null switching to provide an imager capable of useful irradiance imaging at high frame rates, such as 300 Hz.

A tenth objective of the invention is to provide methods, apparatus and systems for providing an imager which has a moderate fabrication cost through using no exotic materials or processes other than available in conventional MEMS and CMOS foundries, and which can provide imagery utilizing ultraviolet, visible, infrared, or terahertz irradiation.

A first embodiment of the invention provides a deflectable micro-cantilever device having a first conductive plate embedded in an insulative substrate and having a voltage of a polarity, a conductive plate on a surface of the substrate parallel with and above the first plate and having an opposite polarity voltage and thus bearing an induced electrostatic charge, and deflectable conductive plate separated by a gap from the surface plate and supported by a cantilever element connected at one end to the surface plate and thus sharing the electrostatic charge.

A second embodiment provides a micro-electro-mechanical sensor having a substrate with a conductive plate embedded therein, a conductive surface plate formed on the surface of the substrate above and parallel with the embedded plate, a deflectable conductive absorber plate supported by a bi-material element parallel to the surface plate and separated by a gap, the deflectable absorber plate being electrically connected to the surface plate to share its electrostatic charge, a first connection lead for applying a voltage having a polarity to the embedded plate, a second lead for applying an opposite polarity voltage to the surface place to induce an electrostatic charge of a first polarity on the embedded plate and an electrostatic charge of a second polarity on both the surface plate and its connected absorber plate, and a third lead for coupling a null-sensing circuit to a micro-electro-mechanical switch contact on the substrate and opposite a switch contact on the deflectable absorber plate, for sensing a null position of the deflectable absorber plate when the deflectable absorber plate bends toward the surface plate in response to the aggregate time-dependent effects of an initial bi-material temperature, incident radiation which increases the temperature of the deflectable absorber plate and bi-material support, and a time-varying repulsive electrostatic field between the same-polarity charges on the deflective absorber plate and the surface plate.

A third embodiment provides a system for displaying an image. The system is an array of micro-cantilever sensors as already described, fabricated on a surface of a substrate. Each one of the micro-cantilever sensors corresponds to a pixel. A common variable voltage source is provided for applying a variable voltage to the array of micro-cantilever sensors with its corresponding array of null-sensing circuits. Each null-sensing circuit is coupled with a corresponding one of the micro-cantilever devices in the array for sensing an open and a closed position of the micro-cantilever switch contacts. The time between switch opening and switch closing is a measure of the irradiation for each micro-cantilever device.

Further objects and advantages of this invention will be apparent from the following detailed description of preferred embodiments which are illustrated schematically in the accompanying drawings.

BRIEF DESCRIPTION OF THE FIGURES

FIG. 8 is a schematic cross-sectional view of a single micro-cantilever sensor.

FIG. 9 shows experimental data: showing example of relation between the micro-cantilever temperature and the signal voltage required for switch opening.

DESCRIPTION OF THE PREFERRED EMBODIMENTS

Figure 1:
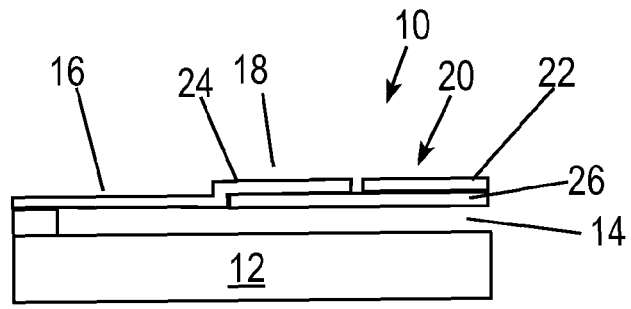
FIG. 1 is a cross sectional view showing a prior art micro-cantilever.
Figure 2:
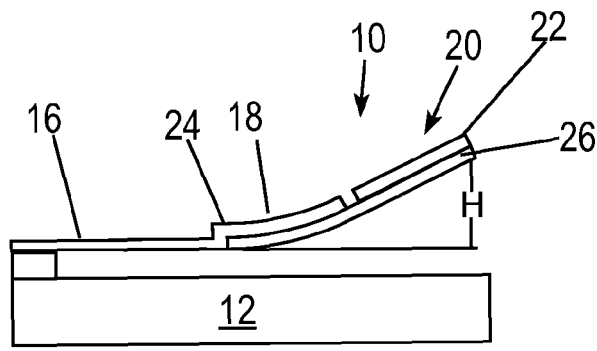
FIG. 2 shows the micro-cantilever structure of FIG. 1 in a deflected position.
Figure 3:
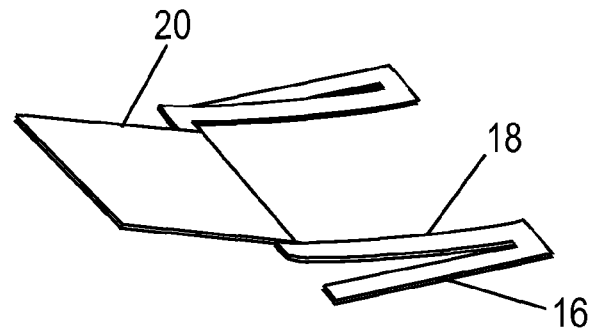
FIG. 3 shows a prior art micro-cantilever with folded support arms.
Figure 4:
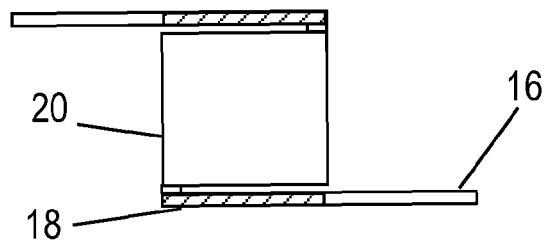
FIG. 4 shows a prior art bridge-style micro-cantilever.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 10 | prior art micro-cantilever |
| 12 | insulating substrate |
| 14 | gap below micro-cantilever |
| 16 | insulator leg |
| 18 | bi-material |
| 20 | absorber plate |
| 22 | absorber material coating |
| 24 | a first layer of the bi-material |
| 26 | a second layer of the bi-material |
| 28 | deflectable absorber plate of joined pair |
| 30 | surface plate of joined pair |
| 32 | embedded plate |
| 34 | voltage source |
| 36 | charge of first polarity |
| 38 | charge of opposite polarity |
| 40 | charge fringe of opposite polarity |
| 42 | attachment anchor |
| 44 | substrate surface |
| 46 | upper switch contact |
| 50 | lower switch contact |
| 52 | lower contact signal lead |
| 54 | adjustable bias voltage |
| 56 | cyclic control voltage |
| 58 | switch latch/elapsed time counter |
| 60 | normalization and linearization of digital time signal circuit |
| 62 | video display |

-continued

| | |
|---|---|
| 64 | absorber height over time, cool target |
| 66 | absorber height over time, warm target |
| 68 | absorber height over time, hot target |
| 70 | actual absorber plate motion before switch closure |
| 72 | switch closed, isothermalization |
| 74 | signal voltage step function; lifts absorber plate |
| 76 | signal voltage in linear decline; decreasing electrostatic force |
| 78 | signal voltage in non-linear decline |
| 80 | precision oscillator |
| 82 | digital latch register |
| 84 | sensor switch latch |
| 86 | sensor N-bit capture register |
| 100 | MEM device |

In some aspects, the present invention embodies both the method and apparatus for converting a pattern of irradiation to a visible image. A preferred embodiment of the present invention provides an array of micro-electro-mechanical sensors formed on a substrate, preferably an insulative substrate. Each sensor includes a deflectable micro-cantilever formed of an irradiance absorber plate supported by a bi-material element which is in turn supported by a thermally insulative element, all electrically conductive and serially connected to a conductive plate on the surface of the substrate. The deflectable micro-cantilever is suspended above the substrate and bends toward the surface plate in response to absorbed incident radiation which increases its temperature. The deflectable micro-cantilever also bends away from the surface plate in response to an applied repulsive electrostatic field between the micro-cantilever and the surface plate. In an aspect, the sensor device also includes a null-sensing circuit coupled to a switch contact on or near the substrate, which senses when the micro-cantilever reaches its null location, by electrical connection with an upper switch contact on the micro-cantilever.

In another aspect, the switch contact is a thermally conductive switch contact serving to drain the accumulated thermal energy on the absorber plate into the substrate. The removal of the accumulated thermal energy on the sensor plate provides a consistent reference temperature for the beginning of each cycle of heat absorption for the measurement of irradiation. In yet another aspect, the repulsive electrostatic field is controlled through an applied voltage, which initiates each measurement cycle and provides a reference signal to which the irradiance signal is added.

FIG. 8 illustrates an exemplary schematic of the present sensor, comprising a cantilever having an absorber plate 28 thermally connected to a cantilever arm 18. Under the influence of environment irradiation, the absorber plate 28 heats up, and transfers the thermal energy to the cantilever arm 18. The cantilever arm is preferably made of a bi-material element, which under heating, bends downward toward the surface plate 30. The above description is exemplary, and the present invention is not restricted to the use of a bi-material element or the cantilever bending downward under the transferred thermal energy induced from the environment irradiation. Other embodiments can be implemented, for example, the cantilever bending upward with increasing temperature, using resonant frequency as a measure of the plate mass, or the cantilever behavior in measuring acceleration.

The cantilever is also subjected to a repulsive electrostatic force from a surface plate 30, preferably disposed parallel and spaced apart from the absorber plate 28. The repulsive electrostatic force mostly applies on the absorber plate 28, with the cantilever arm 18 largely unaffected by the electrostatic force, being narrow and generally remote from surface plate 30. The surface plate 30 is also electrically connected to the absorber plate 28, and thus can share electrical charges with the absorber plate 28. In an exemplary embodiment, the cantilever arm 18 is anchored to the substrate 12 at anchor point 42 through a thermally insulating cantilever leg 16. The anchor point 42 is preferably contacting the surface plate, and thus the surface plate 30 and the absorber plate 28 are electrical conductive through the anchor 42, the thermally insulative cantilever leg 16, and the bi-material cantilever arm 18.

The sensor preferably comprises a support substrate 12 having the surface plate 30 disposed on the substrate surface 44 and a buried plate 32 embedded within. The surface plate 30 and the buried plate 32 are two electrodes (a surface electrode and a buried electrode, respectively) of an electrical source: for example, a bias voltage 54 in series with a signal voltage 56. The electrical source can provide electrical charges to the two electrodes: for example, negative charges to the surface plate 30, induced by positive charges on adjacent buried plate 32, are conductively shared with the absorber plate 28. A repulsive electrostatic field is thus established between the surface plate 30 and the absorber plate 28, repelling the absorber plate. The repulsive force opposes the influence of irradiation, and their balance thus can modify the bending of the cantilever arm in any desired movement ranges. The above description is exemplary, and the present invention is not restricted to the cantilever repulsed upward under the repulsive electrostatic field. Other embodiments can be implemented, for example, an attractive electrostatic field, or a cantilever bending upward with increasing temperature.

With the surface plate 30 being the surface electrode, and the buried plate 32 being a buried electrode of the electrical source, the substrate 12 is preferably an insulative substrate, or at least being insulative around and between the two electrodes. The electrodes of the electrical source are described as plates, e.g., surface plate 30 and buried plate 32, but in general, electrodes of any geometry, volume or shape can be used. Bias voltage supply 54 provides a repulsive force on the absorber plate 28, to compensate the sensor for the ambient, or substrate, temperature. Signal voltage 56 is additive to bias voltage 54, and provides an additional and cyclic repulsive force to the absorber plate 28 to control the data-measurement cycle. The waveform of the signal voltage 56 can be a cyclic sawtooth waveform. Modifying the waveform and timing of the signal voltage supply 56 can change the response curve of the sensor: for example, compensating for non-linearities of the cantilever sensor.

The exemplary sensor device further comprises a switching element for sensing the null position of the absorber plate 28 or the cantilever arm 18. The switching element thus can provide a digital signal indicative of the sensor condition. In an embodiment, the switching element comprises a first switch terminal 50 disposed on the insulative substrate 12, and a second switch terminal 46 disposed on, and electrically connected to the absorber plate 28. The switching element is connected to a measurement circuit for determining the irradiation strength, for example, through a latch/elapsed time counter 58 and a calibration circuit 60, to a display 62. In an aspect, the switching element can also act as a thermal drain, draining the heat accumulated on the absorber plate 28 in the course of a measurement cycle. The thermal drainage of the absorber plate 28 resets the starting temperature and stress in the bi-material element 18, allowing the absorber plate to repeat each measurement from a controlled reference level.

Figure 6:
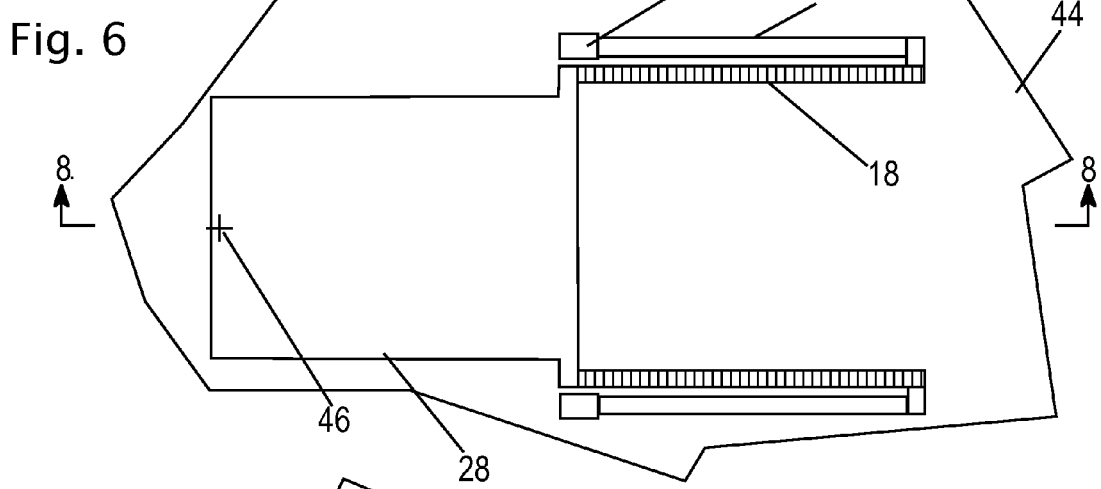
FIG. 6 is a top view of the micro-cantilever showing the upper electrode

FIG. 6 illustrates a top view of the micro-cantilever structure according to a preferred embodiment of the present invention, showing the structure supporting the absorber plate 28 (also called the upper plate or the deflectable plate), together with a switch terminal 46. Deflectable plate 28 is irradiation absorbing and mechanically and thermally connected to a supporting bi-material structure 18, thereby maintaining the bi-material 18 at substantially the same temperature as absorber plate 28. It may be convenient to use any of many other geometries but the geometry of this preferred embodiment allows the area of the absorber plate 28 to occupy a maximal fraction of the available area.

The absorber plate 28 is rigid, and is constructed of a material and configuration for minimum mass. In an embodiment, it is thermally conductive to transmit heat to the bi-material 18. In a preferred embodiment of the present invention, the absorber plate 28 is also electrically conductive. If a convenient but insulative material such as silicon nitride or silicon oxide is sued, a conductive material (e.g., metal) outer layer such as gold can be coated to the nonconducting silicon nitride. In such a case, care should be made to prevent adverse thermo-geometric effects, resulting from the bi-material construction of the absorber plate. For example, ceramics with addition of a conductive layer on both top and bottom should be used. Alternatively, in a preferred embodiment, the absorber plate is made of homogeneous graphite, satisfying all the desired requirements. Graphite is stiff, has low density, is thermally and electrically conductive, and has moderately high optical absorption.

A thermally resistive "insulator" leg 16 supports the opposite end of the bi-material 18 and is mounted by an attachment point or "anchor" 42 to the substrate surface 44. In an embodiment, the substrate material is chosen to have a high electrical resistivity and high breakdown voltage, such as un-doped silicon or silicon dioxide. The absorber plate 28 and bi-material 18 have relatively high thermal conductivity and thus, under irradiation, substantially all the temperature drop is across the insulator leg 16 supporting the bi-material.

Micro-cantilever absorption of incident radiation of a predominant wavelength is enhanced by positioning the absorber plate 28 a quarter-wavelength above a reflective surface plate on the substrate. This optically resonant positioning maximizes the electric field of the radiation within the absorber plate 28.

In an embodiment of the invention, the absorber plate 28 intrinsically absorbs the radiation of interest such as, but not limited to, ultraviolet, visible, infrared, terahertz or charged-particle radiation. Alternatively, the absorber plate includes a coating which absorbs the radiation. For enhanced absorption of electromagnetic radiation, the preferred coating is a metal black, such as gold black. Gold black is gold evaporated in a partial vacuum, with a neutral residual gas such as argon or nitrogen at a gas pressure between 1 and 10 Torr. The gold atoms collide with the gas, are cooled, collide with each other, and form a filamentous coating on the substrate. Typically the coating has a density less than one percent that of the solid metal. Gold black (or aluminum, nickel or other conductor) is among the most absorptive coatings known, across the visible and infrared regions. Even at terahertz frequencies, a very thin (tens of microns) coating of gold black is strongly absorbing, when the conductivity is in the range of approximately 1 to approximately 1000 ohm per meter.

The bi-material 18 is made of materials chosen to have a maximal differential coefficient of thermal expansion (CTE). The principles of operation of bi-material micro-cantilever devices are well known to those skilled in the sensor art. In the past, silicon carbide or silicon nitride has been used for the low-CTE layer, and gold or aluminum for the high-CTE layer. In a preferred embodiment silicon dioxide is used for its low CTE, approaching zero, and zinc is used for its high CTE. Though selenium and plutonium each have higher CTEs, their use in industrial processes is problematic. Polymers may be used for their very high CTEs, but have limited mechanical strength, particularly in the very thin films required for high bi-material element sensitivity.

In addition to differential thermal expansion, another parameter determining the responsivity (microns of plate deflection per degree C.) of the bi-material is its thickness, or the separation between the center, or neutral, fiber of each of the bi-material layers. Responsivity increases with decreasing bi-material thickness. However, the mechanical resonant frequency of the absorber plate mass on the flexing bi-material support also decreases with bi-material thickness and stiffness.

In some embodiments, a terminal switch 46 is incorporated in the absorber plate 28, which in closing at the end of each measurement, renders the present sensor to be vibration-insensitive to harmonic oscillations. Vibration sensitive sensors which are free to respond to resonant acoustic disturbances can absorb sufficient mechanical energy to destroy the signal or the micro-cantilever itself, unless the mechanical resonance is higher than the frequency of the acoustic disturbance. In the past this has meant that such cantilevers and bi-material elements necessarily were relatively thick, to get the mechanical resonant frequency above typically 20,000 Hz, to the detriment of the bi-material responsivity (generally between 0.04 to a maximum of 0.25 microns per degree C.). In exemplary embodiments, the present sensor comprises a switching element, which includes a contact (e.g., first terminal 50 disposed on the substrate surface 44 and second terminal 46 disposed on the absorber plate 28) to essentially stop any accumulated vibration or unwanted mechanical movement of the micro-cantilever at the end of each measurement cycle. As a result, the present sensor is not limited to relatively stiff bi-material designs. With this vibration-insensitive design, the present bi-material sensor can be made as thin as desired, limited only by fabrication techniques. The immediate benefit of this thinner bi-material and the improved choice of materials is a higher responsivity, for example, approximately 1.3 microns/degree, or 5 times greater sensitivity than available in prior art.

Still referring to FIG. 6, in an embodiment the insulator leg 16 typically of silicon nitride or silicon dioxide is made electrically conductive with a thin coating of a conductor such as gold or aluminum. The coating thickness is in the range between approximately 20 to approximately 100 nanometers to provide electrical conductivity with minimum thermal drain. The function of the insulator leg 16 is to thermally isolate the absorber plate 28 and the bi-material 18 from the substrate 44 heat sink. The thermal conductance of the insulator leg 16 in part determines the thermal time constant of the micro-cantilever 10.

In the past it was necessary to stabilize the temperature of irradiance-sensing element before its value (resistance, capacitance or the like) could be recorded. Thus the thermal time constant was necessarily a fraction of a frame time, and making the final signal relatively small. Through the use of frame-dynamic irradiance sensing, in an embodiment, the present invention makes such intra-frame temperature stabilization for absorber plate 28 unnecessary. The thermal time constant is no longer limited, and can be increased to exceed the frame time by decreasing the conductance of the insulating leg 16. With the insulator leg having a very low thermal conductance, the temperature of the plate rises continually during a frame time to a higher final value. With a longer thermal time constant, the deflection of the bi-material is greater, and the measured temperature response to a given irradiance is greater than in prior art devices.

Figure 7:
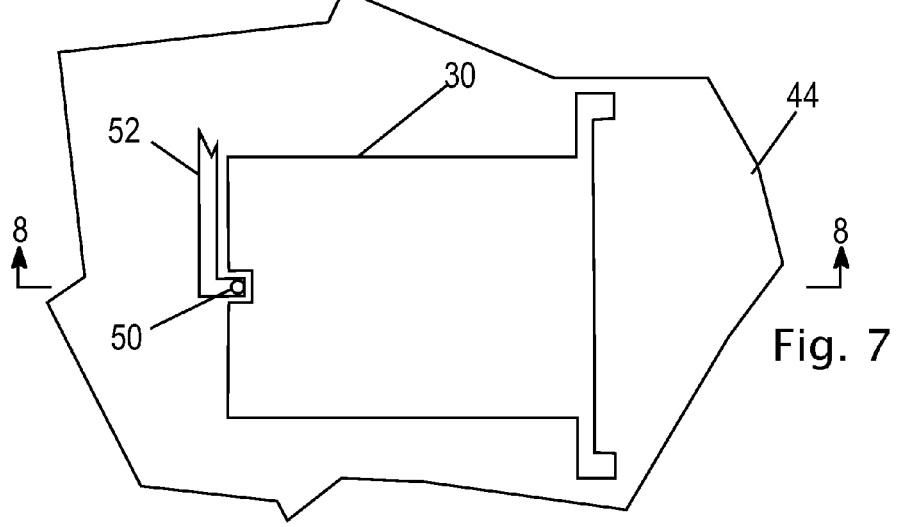
FIG. 7 is a top view of a surface plate and middle electrode on the substrate.

FIG. 7 shows an embodiment of the surface plate 30 affixed to the substrate surface 44, located under the absorber plate 28. The surface plate 30 is fabricated of conductor such as gold or aluminum and though not here shown, is electrically connected with the anchor 42. As noted above, the serially connected anchor 42, insulator leg 16, bi-material 18, and absorber plate 28 are made electrically conductive by application of a thin conductive over-coating of metal such as gold or aluminum when necessary.

In some embodiments, the surface plate 30 provides an electrostatic force on the absorber plate 28 counter to the bending of the cantilever arm 18. The counter force is preferably established by a repulsive electrostatic field between the surface plate 30 and the absorber plate 28, generated by a supply voltage, for example, a bias voltage 54 in series with a cyclic signal voltage 56. The counter force serves to compensate the sensor response for ambient or substrate temperature, provides a cyclic component for signal generation, and can be modified to tailor the linearity of the irradiance measurement. The counter force is preferably a repulsive electrostatic force, but can be any force generated from a voltage supply, such as attractive electrostatic force.

In an embodiment, the surface plate 30 extends to encounter the anchor points 42, for providing connection with the leg 16 and the cantilever arm 18. The surface plate 30 can have a notch corresponded to the switch terminal 46 from the absorber plate 28. Disposed at the notch is a switch terminal 50 having a connection 52 leading to the measuring circuit.

Figure 5:
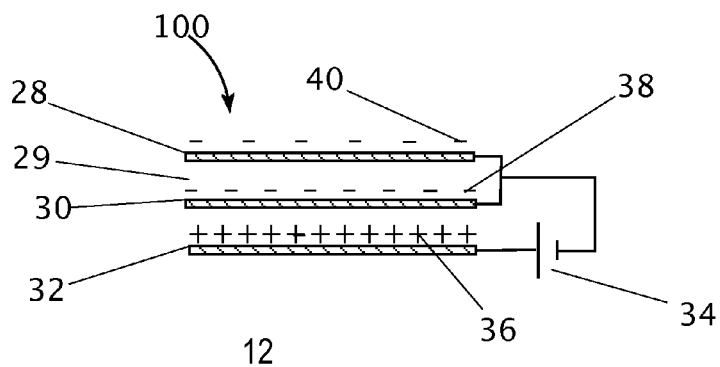
FIG. 5 shows disposition of electrostatic charge on a three-element configuration.

FIG. 5 is a schematic diagram showing the electrostatic principles of certain embodiments of the present invention. The micro-cantilever structure 100 shown in FIG. 5 includes a conductive deflectable plate 28 and a conductive surface plate 30 substantially parallel to the deflectable plate 28, which plates are electrically connected and are separated by a gap 29. The deflectable plate 28 and surface plate 30 are electrically connected to a parallel conductive embedded plate 32 through a voltage source 34. The configuration shown in FIG. 5 includes a battery 34 as the voltage source, although alternative voltage sources may be substituted. Battery potential 34 causes electric charges 36 of one sign to appear on embedded plate 32 and charges 38 of opposite sign to appear on surface plate 30, according to the electric field between the plates.

In the example shown, the embedded plate 32 has a positive charge 36 and the surface plate 30 has a negative charge 38, although the charges on the plates can be reversed. The induced charge 38 on the surface plate 30 self-repels and a portion 40 of the electrical charge on the fringe of the electrical charge 38 migrates to and spread across the deflectable plate 28. Generally, the fringing charge 40 on the deflectable plate 28 is less than the electrical charge 38 on electrically connected surface plate 30, although their sum is equal to the opposing charge 36 accumulated on the embedded plate 32. The transferred charge 40 on the deflectable plate 28 is repelled by the field of the same-polarity charge 38 on the surface plate 30 in a manner similar to the familiar gold-leaf electrometer. The transferred change 40 is determined according to the formula:

Force $F_{28}$ on deflectable plate 28 is equal to the charge $C_{40}$ on upper plate 28 times the charge $C_{38}$ on surface plate 30 divided by twice the mutual area times $e_0$, where $e_0=8.854\times 10^{-12}$ farad per meter, the permittivity of free space, which can be rewritten as:

$$F_{28} \approx (C_{40})[(C_{38})/2(\text{mutual area})(8.854\times 10{-12}\text{ farad per meter})$$

assuming there are no edge effects, meaning that the plates are much larger than the gap between the upper plate 28 and the surface plate 30.

Referring now to FIG. 6, in some embodiments, the sensor device comprises a switch contact for sensing the absorber plate or the cantilever arm at a predetermined null position. The switch is preferably an electrical switch, thus providing a digital signal indicating the moment when the sensor arm leaves or reaches the switch location. In an embodiment, the switch comprises an upper switch contact terminal 46, (better shown in FIG. 8), connected with the lower surface of the absorber plate 28. An example of a location for the upper switch contact is marked by the cross 46 on the absorber plate 28 in FIG. 6. A lower contact terminal 50 shown in FIGS. 7 and 8 is located below an upper switch contact terminal 46 on the absorber plate 28 shown in FIG. 6. In this embodiment the end of the conductive surface plate shown in FIG. 7 is notched to prevent electrical contact between the lower switch contact 50 and surface plate 30. Lower contact 50 is connected to the null-sensing circuitry (not shown) by electrical signal lead 52. The micro-cantilever components are electrically conducting, either intrinsically or by addition of a conductive film, in order to electrically connect the upper switch contact 46 to the substrate 44 at the anchor point 42. Alternatively, the switch element can be a contactless switch, or any switch component changing state when the cantilever passes through a certain predetermined position. However, a contact switch is preferred since it can be used to reset the thermal energy accumulated on the absorber plate 28.

As the absorber plate 28 is irradiated its temperature increases and the contiguous heated bi-material 18 presses the absorber plate 20 downward against the declining repulsive electrostatic field. The position of the micro-cantilever is sensed at the null position by the opening or closing of the switch contacts: the moment of measurement. As a result, positional and process non-linearities associated with bending out of the null position have no impact on the quality of the final measurement.

In use for sensing or imaging, the motion of the micro-cantilever is terminated at the end of each frame by the closure of switch contacts between absorber plate 28 and the substrate 44. This has three beneficial results. First, it indicates return of the absorber plate to its null position. Second, the accumulated heat from absorbed irradiance is rapidly drained from the absorber plate through the switch contact, isothermalizing the absorber plate and bi-material with the substrate. And third, it stops any accumulated vibration or unwanted mechanical movement of the micro-cantilever. Thus each frame measurement is begun with the micro-cantilever sensor returned to its initial conditions.

Within a video frame time there is insufficient time to absorb damaging resonant energy in an ordinary acoustic field. In the present invention, periodic arrest of all cantilever motion has the added benefit of insensitivity to shock, such as from firing when mounted on a rifle, where a single frame may be disrupted.

In some embodiments, the switch element can be employed for measuring the environment influence by the time required for the switch element to change states. The extent of bending of the micro-cantilever with increasing temperature as radiation is absorbed is perceived as an increasing force acting to close the switch against a controlled, declining, repulsive electrostatic force acting to keep it open. The electrostatic force is increased according to increase in the applied voltage between the embedded plate and the surface plate. When voltage is varied in a repeated cycle ending in isothermalization, the time between switch opening and closing is a measure of the sampled and absorbed irradiance.

Returning to FIG. 8, which is a schematic diagram of a preferred embodiment of the sensor system according to the present invention, the absorber plate 28 is supported by bi-material element 18 and insulator leg 16, with a mobile switch contact 46 which contacts with the lower contact 50 on the substrate. The substrate switch contact 50 is connected with the signal lead 52 approximately on the surface 44 of the substrate 12. The surface plate 30 is formed on the substrate surface 44, leaving a gap 14 between the absorber plate 28 and the surface plate 30. The gap 14 should in principal be as thin as practical to maximize the electrostatic effects on which this invention depends. One of the advantages of the preferred embodiments of the present invention is that in practice the gap 14 can be as little as a fraction of a micron to improve sensitivity. A conductive embedded plate 32 in the substrate 12 below the conductive surface plate 30 is electrically connected via bias voltage 54 and control voltage 56 in series, to the joined surface plate 30 and absorber plate 28 to create the separation of charge shown in FIG. 5.

In the schematic example of FIG. 8, a negative charge is impressed on the embedded plate 32 with a positive charge on the surface plate 30. This electrical field between plates from this separation of charge creates an attractive force between the respective plates which are separated by the intervening insulating substrate 12. By mutual repulsion within the charge sheet, the fringe of the positive charge impressed on the surface plate 30 extends onto the absorber plate 28 to share between the plates 28 and 30. Thus the absorber plate 28 is repelled from the surface plate 30 by their like charges in the same manner as an electrometer. This force is proportional to the square of the sum of bias voltage 54 and the cyclic control voltage 56 and is inversely proportional to the square of gap 14 between the surface plate 30 and the absorber plate 28.

In an embodiment, the repulsive force is opposed by the influence of the environment, such as the irradiation field heating the absorber plate to progressively bend the cantilever arm. As the signal voltage 56 declines to its base value, the increasingly strong force of the irradiance-heated bend presses the absorber plate 28 downward until the switch contacts 46 and 50 close at the null position. By the end of the measurement period, when the control voltage 56 has returned to its base value, the contacts are at rest in mutual contact, isothermalizing the absorber plate with the substrate 12 by their thermal conduction.

In a preferred embodiment, the upper and lower contacts 46 and 50 are designed to be minimally influenced by diffusion welding of the contacts to avoid surface damage and a breakaway voltage requirement, such as by the use of a diamond-like carbon for the contact material, although other conductive substances may be used. Additionally, in the preferred configuration the absorber plate 28 is graphite and the lower contact 50 is gold so that the lattice constant mismatch between these materials minimizes diffusion bonding.

The residual stresses in the bi-material leg are controlled in fabrication, such that at room temperature and without voltage applied, the switch is reposed in the closed position. The upper contact 46 is mechanically pressed against the lower contact 50 by the bend of the bi-material element, to maintain the gap 14 between the absorber plate 28 and the surface plate 30. At a sufficiently low temperature and/or sufficiently high bias voltage 54 the absorber plate 28 lifts or is repelled away from the surface plate 30 and separates the switch upper contact 46 from the lower contact 50. This is referred to as the "lift-off" temperature for a particular voltage.

The voltage control inputs of FIG. 8 include a DC bias voltage 54 of zero to a few hundred volts, added to a cyclic control voltage 56 in a range of a few volts to tens of volts. The voltage sources 54 and 56 are serially connected between the embedded plate 32 and the pair of mutually connected surface 30 and absorber 28 plates. The function of the bias voltage 54 is to provide electrostatic repulsion to overcome the bend of the bi-material induced by ambient or substrate temperature. In one embodiment this bias voltage 54 is a manual setting chosen by the user to exclude objects below a certain radiance from the image recording.

FIG. 9 is a graph showing lift-off voltage as a function of substrate temperature for a typical sensor of the present teaching. The experimental data shown in FIG. 9 illustrates the electro-mechanical operation of an exemplar micro-cantilever sensor having an absorber plate size of approximately 60×80 microns (μ) with the separation between the surface plate 30 and the absorber plate 28 at null position of approximately 2μ.

In this experiment the temperature of the bi-material was adjusted by placing the substrate in contact with a thermoelectric temperature-variable plate. At each sample temperature shown on the abscissa in FIG. 9, the bias voltage 54 is increased until the absorber plate 28 is electrostatically repelled or "lifts off", opening switch contacts 46 and 50. As illustrated with a straight line overlay for comparison, the variation of lift-off voltage with temperature is very nearly linear.

The slope of this dotted data line is approximately 3.65 volts per degree C. For comparison, the cantilever of this sensor design reaches a steady-state change in temperature of approximately 1° C. due to received irradiance from a human-temperature target. Thus, in this example an appropriate scale for the cyclic control voltage 56 is less than 5 volts peak to peak for imaging humans.

By stresses locked in at manufacture, this micro-cantilever experimental sample was manufactured so the contacts are open at a temperature below minus 16.6° C., and the sensor would not be useful below that temperature. At an ambient temperature of 20° C. the bi-material causes the contacts to press strongly together, and in this example of FIG. 9 a voltage of approximately 122 volts for the bias voltage 54 is required to lift the strained bi-material enough to break switch contact at 20° C. The user in the field might for instance choose to set the bias voltage 54 at 120 volts, with a periodic sawtooth voltage 56 of 3 volts peak, to obtain switch closure within the time of each cycle of voltage 56 followed by opening for a new measurement at the beginning of the next sawtooth cycle.

The substrate in this experimental MEMS sensor example was found to break down for a total voltage of 54 plus 56 greater than 190 volts, limiting the electrostatic upper compensation in this example to 37° C. This sensor example of FIG. 9 may here be seen to be usable over a substrate temperature range of minus 16.6° C. to 37° C., wherein a selectable electrostatic force suffices to overcome the bi-material force and open the switch. As will be evident to one skilled in the art, these temperatures of least and greatest substrate temperatures may be adjusted over a wide range, by choice of materials, deposition methods, physical dimensions of the layers, and other conventional process parameters.

When the micro-electromechanical device is used in arctic conditions, it is useful to heat the substrate to provide a bias thermal load to supplement the bias voltage to maintain the substrate temperature at any convenient temperature higher than its lift-off temperature at zero applied voltage 54. In this arctic case, it is sufficient that the auxiliary heat merely bring the substrate within the operating range of electrostatic stabilization of the micro-cantilever.

In the preferred embodiment, automated feedback control of the bias voltage 54 in real time is accomplished by reading a number of additional reference radiation sensors from which the incident radiation is blocked. Typically the reference radiation sensors are uniformly distributed around an array of the sensors to measure the average temperature of the substrate. If the bias voltage 54 for the array of radiation sensors is set by a feedback circuit such that these reference sensors are just below the threshold of switch opening for a selected irradiance level, then with the addition of control voltage 56 the measured switch time values from the array of exposed sensors are direct measurement of the irradiation image intensity above the selected threshold level. Thus, complete compensation for the base temperature from which the temperature-sensitive bi-material measures irradiance is accomplished without altering the physical temperature of the substrate, as has been required for prior art devices.

In an aspect, a measurement of the sensor response to the irradiation field is the time between switch changing states. For example, the lower contact 50 is connected to a switch latch/elapsed time measurement circuit 58 via the lead 52. The switch latch/elapsed time measurement circuit 58 is initiated when the switch opens and is terminated when the switch closes. In one embodiment this switch stores the control voltage 56 at the time of switch closure as indicative of the time. In a preferred embodiment this circuit is a register slaved to an external oscillator/counter. The length of time between switch opening and closure is a measure of the absorbed radiation. The time value is transmitted as a data stream to normalization and calibration circuit 60 which displays the result on video display 62.

An exemplary process for using the present sensor comprises first setting the sensor arm to the null position. The switch contact is closed, essentially zeroing the temperature difference from the substrate. A voltage step is then applied, generating a repulsive force for repelling the sensor upward. Leaving the drainage position, the absorber plate begins to collect and integrate irradiation which makes the temperature climb steadily, which steadily increases the downward flexural force. At the same time the voltage 56 is declining. The balance of forces of the decreasing repulsive force and the increasing force from the rising temperature in the bi-material element moves the sensor arm toward the contact. The time for the contact to close is an indicative of the time-dependent temperature of the bi-material leg 18 and hence of the strength of the irradiation field. If there is no irradiance the time of closure is the time when the voltage 56 returns to is base value. If there is some irradiance the contacts close sooner. If there is a great deal of irradiance the contacts close even sooner. At contact, the absorber plate quickly loses the accumulated heat through the thermal drainage contact. The cycle of the control voltage 56 then re-starts.

In a preferred embodiment, the strength of the irradiation field is measured by the time between the switch changing states. This time can be adjusted by the voltage waveform, which then can vary the response function of the sensor. The following paragraphs describe the response of the sensor arm without the applied voltage, the response of the sensor arm without the irradiation field, and the response of the sensor arm under the combination of the applied voltage and the irradiation field.

Figure 10:
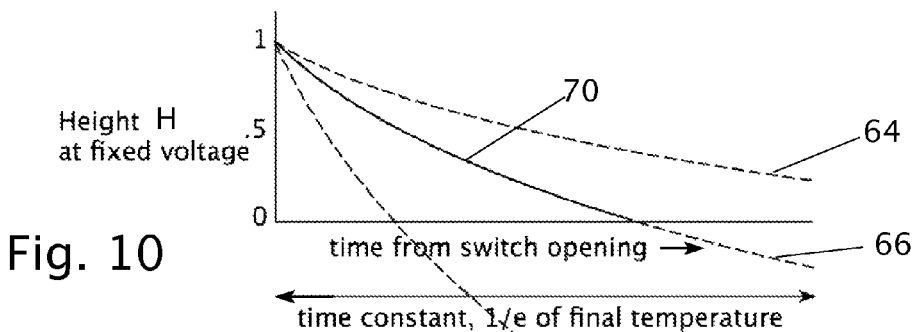
FIG. 10 height of the absorber plate with time, absent electrostatic effects

FIG. 10 is a graph schematically showing the thermal-irradiance properties of the sensor structure without applied voltage, chilled to raise the unirradiated absorber plate a unit distance above zero. When a steady radiant-heating of the freely suspended absorber plate 28 begins at zero time, absorbed heat builds in the absorber plate 28 and attached bi-material, and the bi-material flexes gradually in a downward direction with rising temperature. Over time the temperature rises and the height of the absorber plate 28 decreases slowly as shown in the graphs by line 64 or quickly as shown in the graphs by line 68 according to the irradiance. At an intermediate heating rate the theoretical position of the tip of the moving absorber plate is shown as a dotted line 66 and the actual trajectory of the absorber plate is shown as a solid line 70 which ends at zero height by the closure of the switch contacts. The time between switch opening at the beginning of the heating cycle and return of the absorber plate to null position is a measure of the irradiance on, or heating rate of, the absorber plate.

The temperature of the absorber plate and bi-material rises to within 1/e or 63.2% of its final value in one "thermal time constant". The thermal time constant is equal to the heat capacity of the absorbing plate plus bi-material divided by the thermal conduction of the insulator structure. In the present invention, the time constant is preferably 1 to 2 times the length of measurement time to provide a time-variable temperature having a slope that is co-variable with irradiant power and to maximize the temperature rise and resultant deflection of the bi-material leg.

Figure 11:
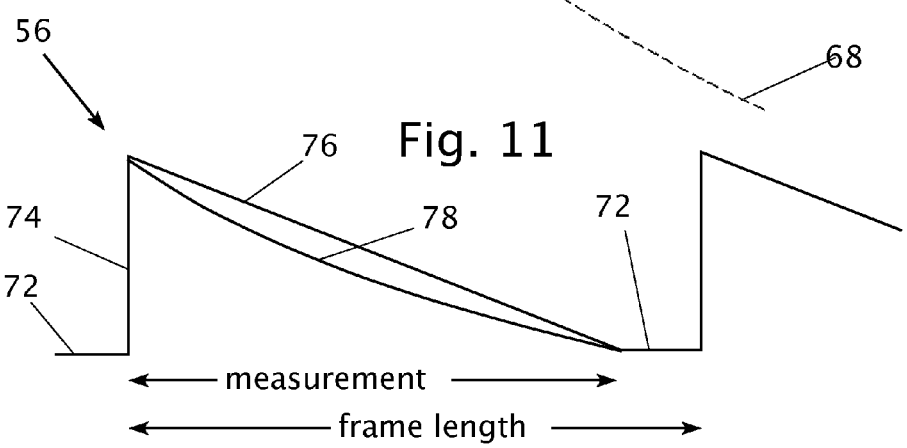
FIG. 11 shows example of a driving voltage cycle.

Without the irradiation field, the response of the sensor arm is a function of the applied voltage which generates the repulsive electrostatic field. FIG. 11 shows a typical cyclic waveform used as the control voltage. In a preferred embodiment, the cyclic control voltage 56 is a declining sawtooth wave 76, typically of a few volts peak to valley, and has a cycle frequency equal to the video frame rate.

At the beginning of a frame 72 the control voltage 56 is at its base value, and the switch contacts 46 and 50 are closed, and switch height H is zero. The micro-cantilever heat is drained through the contacts to isothermalize the absorber plate 28 and bi-material 18 with the substrate 12. Bias voltage 54 is adjusted to, for example, one volt less than necessary to open the switch contacts. At the initiation 74 of the frame as FIG. 11 indicates, control voltage 56 is additively imposed between the surface plate 30 and the embedded plate 32 as a step function 74, lifting the absorber plate 28 a distance above its null position and opening the switch contacts. Absorbed irradiance is now integrated in the absorber plate 28 to steadily heat the absorber plate 28 and its attached bi-material 18. The increasing temperature causes the bi-material to flex downward, steadily increasing a downward pressure of the absorber plate 28 against the programmed, diminishing, electrostatic repulsion between the surface plate 30 and the absorber plate 28.

The control voltage 56 is steadily decreased to a selected base value 72 until by the end of the frame, all switch contact pairs in the sensor array have closed and ended their individual measurements. In the preferred embodiment, the control voltage 56 is generally the shape of a sawtooth wave 76 as depicted in FIG. 11, although for purposes of linearization or other alteration of the transfer function, the waveform 78 may depart from a linear relationship with time. Alternative control voltage cycles will be obvious to those skilled in the art with an understanding of the sensor of the present invention. The control voltage in this embodiment is the periodic sawtooth wave 56 shown in FIG. 11, with a period equal to the selected frame rate and a selected peak voltage of a convenient value, typically in the range of 5 to 10 volts peak to valley. As shown in FIG. 11, the bias voltage is set such that the switch is closed when the sawtooth waveform is at its minimum (72), and the absorber plate 28 becomes isothermalized with the substrate 12. At the beginning of a measurement cycle or frame, the voltage increases (74) to a peak voltage to lift the absorber plate and open the switch, to initiate the irradiant heating of the absorber plate. As the signal voltage 56 then decreases (linearly 76 or non-linearly 78) the electrostatic force decreases. By the time the sawtooth voltage returns to its minimum (72), the switch returns to the closed position.

The interval between switch contact opening and closing is the measure of the irradiance and is referred to hereinafter as the "switch time". When the target has the same radiance as the sensor (no net energy flow) switch time is essentially equal to the base interval of the control voltage waveform 56. By the end of the measurement period all the switches have closed. Typically this measurement period is approximately 30 milliseconds for a 30 hertz frame rate, or approximately 15 milliseconds for a 60 hertz frame rate.

After the first switch closure in a particular sensor the absorber plate generally exhibits a slow oscillation or chatter with amplitude decreasing with decreasing control voltage 56. This results from the cantilever repetitively chilling against the colder substrate and its then rising to accumulate a subsequent heating, lowering load. After the switch opens at the start 74 of a timing period, only the first switch closure for each sensor element is recorded as the measurement event.

Thus the waveform of the applied voltage can change the response of the sensor, meaning the time for the sensor arm to reaches the switch position. The trajectory of the moving contact is illustrated for an exemplar sensor by the graph shown in FIG. 12 for various target normalized radiances. The graph corresponds to the example for micro-cantilever model with a control voltage 56 having a sawtooth waveform that linearly decreases from an initial peak value. Although the sensor may be used for any wavelength absorbed by the absorber plate or its coating, the graph shown in FIG. 12 models a thermal IR sensor absorbing a range of 8 to 14 microns wavelength with corresponding target temperatures indicated at the right. The temperatures of the radiating blackbody targets sequentially vary in temperature by a ratio of 2:1.

Figure 12:
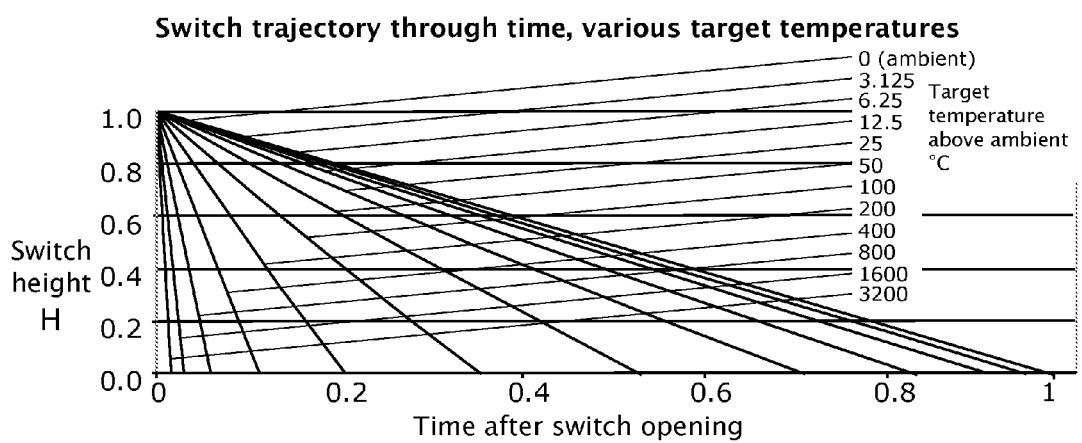
FIG. 12 shows height H of absorber plate with time, including the effects of both target radiance and varying driving voltage.

In the example of FIG. 12, for a target 2° C. above the substrate temperature, the absorbed irradiation induces a thermal flexure of the bi-material, which adds to the electrostatic cycle to close the switch in approximately 98% of the measurement time. For a target 20° C. above substrate temperature, the switch closes at approximately 73% of the measurement time, and for a target 200° C. above substrate temperature the switch closes at approximately 20% of the measurement time. For a target 2000° C. above substrate temperature the switch closes at approximately 3% of the measurement time.

It is useful to note that this measurement is preferably a digital measurement, with the switch time based on counting pulses from a reference precision oscillator. In the past, infrared sensors have required detection of a very small analog signal in a very noisy analog background; all of this is avoided in the present invention. Using a 14 bit counter the digital uncertainty for a typically time measurement is ±1 bit, or approximately ±0.006% of the measurement time, or less than one millikelvin for targets near ambient. Thus, unlike the prior art analog measurement of resistance or capacitance, with Johnson and high-impedance amplifier noise, the measurement obtained with the present invention has only the digital noise of approximately ±½ of a clock cycle, plus the inherent thermo-mechanical noise of the cantilever.

One of the primary benefits of the present invention is that the relation between irradiance and the switch time is not a linear measure. A large change in the switch time is provided at low target radiance (e.g., target temperature near that of the substrate), and progressively smaller changes in switch time with increasing target radiance.

In one embodiment the actual sawtooth control voltage Vc 56 at which the switch closes is recorded and used as a measure of the length of time the control voltage has decreased. For a linear sawtooth-wave control voltage waveform, the variation of switch closure voltage with target radiance is shown in FIG. 13, with the normalized abscissa interchangeably calibrated as switch time or its voltage equivalent (1-Vc).

Figure 13:
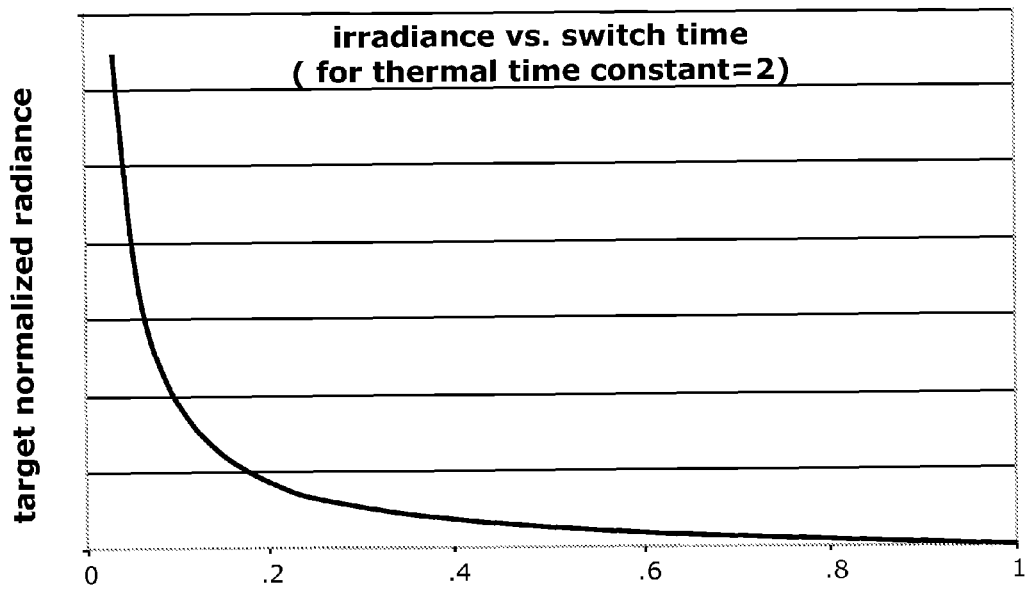
FIG. 13 normalized temperature of radiating target versus elapsed switch time FIG. 14 target normalized radiance versus elapsed switch time; logarithmic ordinate scale
Figure 14:
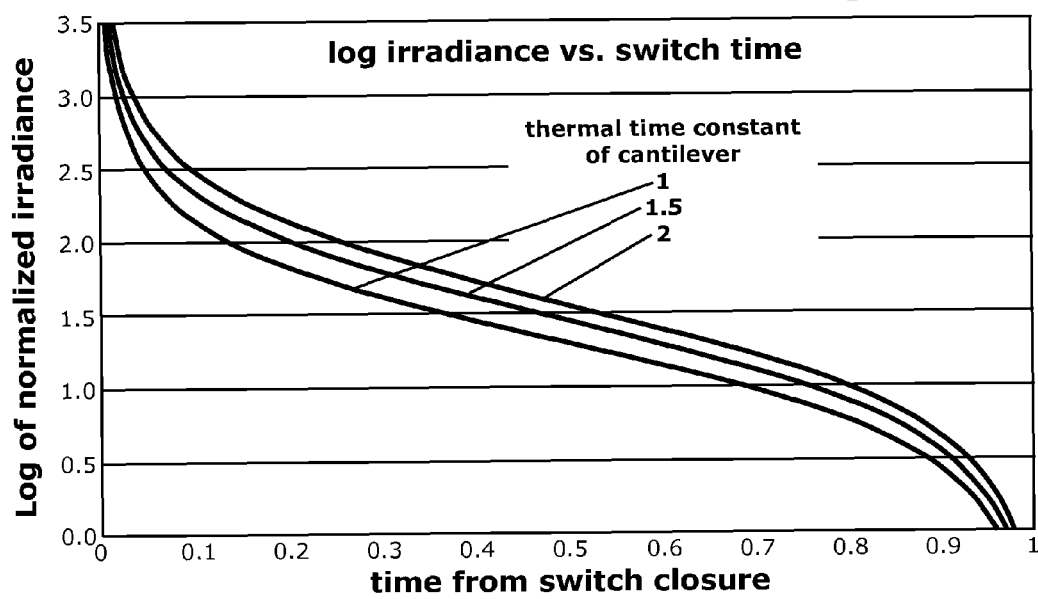

The irradiance transfer function is further illustrated in FIG. 14, where the logarithm of the relative target radiance of FIG. 13 is shown versus the switch time. Three exemplar curves are shown, for thermal integration time of the cantilever equal to approximately 1, 1.5 and 2 times the base interval of the control voltage. The responsivity of the sensor is pseudo-logarithmic over much of the time scale, with compression of the radiance scale at high temperatures and switch time approaching zero, and expansion of the radiance scale as the radiance approaches ambient and switch time approaches 100%.

At low target radiance, the switch time changes rapidly with elevating target irradiance, giving the sensor high resolution for low radiance, or "low temperature" targets when infrared irradiation is being measured. At intermediate target radiance the switch time changes more slowly, approximately as the logarithm of irradiation. At the highest target radiances and short switch time, the target temperature becomes increasingly sensitive to switch time, with a slope approaching infinity as the switch time approaches zero. At all values the relationship is monotonic.

In the prior art great virtue was made of various methods for achieving "linearity" in the measurement. In general these failed, and a lookup table was necessary between the sensor and the display to compensate for pixel-to-pixel sensitivity variations and to linearize the data. Unlike the prior art, in the present invention a lookup table is implicit and can thus produce any desired relationship between the switch time and the gray scale on the final display, as will be familiar to one versed in the electronics display art.

In some application, it may be useful to display the data linearly, such that a given displayed change in gray scale corresponds to a specific temperature change, such as 0.5° or 5°. This allows the device to be used as an imaging radiometer, for the limited temperature range available to be displayed which is typically 8 bit, or 256 steps in temperature resolution.

In a thermal infrared viewer the usual application is to view primarily human-temperature targets of approximately 33C.°, with a strong interest in faintly warm patterns like the heat of footprints and a tertiary interest in hotter objects such as burning objects and the flames themselves. In a preferred embodiment of data manipulation, a logarithm of the temperature is displayed to emphasize faint patterns such as the shape of a person behind a wall, clearly delineating the detail of a human figure and still showing the details of the burning building and the flames behind the human figure.

This maximizes the useful information delivered to the human viewer by the generally available 256 gray shades of the visual display. Possessing "logarithmic vision" will of course be a new capability, and like any augmented-vision instrumentation, will require some personnel training to fully utilize.

In prior art bolometer or micro-cantilever sensors the frame rate was limited by the sensor noise and the size of the signal generated in the measurement time available. Thus thermal imagers require the use of the fastest (largest diameter, most expensive) objective lenses, typically F/1, and are rarely useful at higher than approximately 60 Hz frame rate.

The present invention provides an enhanced responsivity of the micro-cantilever by virtue of improved bi-material materials and deceased bi-material thickness as compared with the parameters of prior micro-cantilever art.

Another advantage of the present invention is that the bias and control voltage noise is simply that of capacitor noise, and the effective noise of the oscillator is reduced to plus or minus one-half-cycle of the selected oscillator frequency. While this yields a noise equivalent radiation which is much smaller than required by usual sensor applications, this advantage may be employed to increase the frame rate (decrease the measurement time). In that case, the thermal time constant is reduced with a corresponding reduction in bi-material temperature. In other applications the advantage in overall sensitivity is utilized to reduce the cost of the imaging optics, such as by using a smaller diameter lens or fabrication from less transmissive materials.

Figure 15:
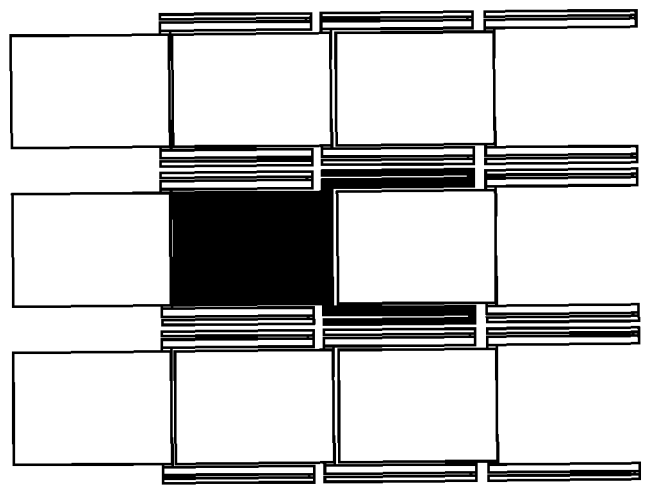
FIG. 15 shows an array of sensors

FIG. 15 shows plural sensors designed to maximize the active area of the absorber plate when arranged in an array, with a single micro-cantilever sensor indicated in black.

Figure 16:
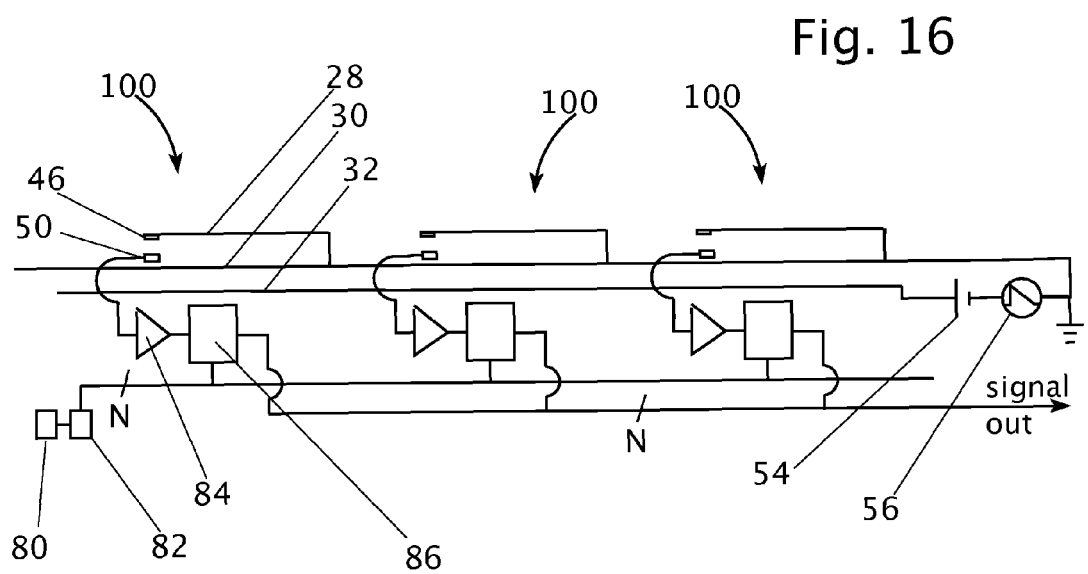
FIG. 16 shows an exemplar electronics circuit diagram of the operating system

FIG. 16 is a schematic diagram of a preferred embodiment in which the sensor array uses a common source 82 of clock information and a common source of bias voltage 54 and control voltage 56. A precise frequency digital clock source 80 is typically a crystal oscillator operating at 1,092,267 hertz for an example of 14 bits of information in 15 milliseconds of measurement time at a 60 Hertz frame rate. The digital counter 82 accumulates the oscillator pulses beginning with the step function 74 of control voltage 56 which opens the plural sensor switches substantially simultaneously, and the counter 82 is zeroed at the end of each frame. This pulse count is digitally displayed to all sensors in the array. In this embodiment, each sensor has a digital latch register 86 which in this example is 14 bits and which mirrors the master counter 82. Upon closure of switch contact 46 and 50 a switch latch or "switch debouncer" 84 freezes the instantaneous counter value in the latch register 86. As a result, each sensor digitally records the remote pulse count or time of the corresponding switch closure. The recorded times are read out at the end of the frame time as a stream of digital numbers by row-column rastering readout to form the signal output.

The digital output signal then goes to a lookup table where the nonlinearity of the measurement scale of FIG. 14 is modified to transform the signal from quasi-logarithmic to a linear or logarithmic final display, or other transform function as may be preferred.

The data stream then goes to a second and two-dimensional lookup table where corrections are made for variation in the sensitivity of individual pixels. By virtue of the quasi-logarithmic response of the sensor, this second lookup table is a simple additive correction rather than the much more complicated multiplicative correction required by prior art linear bolometers.

The normalized and scaled digital stream is then exported for video display. These prior-art signal conditioning lookup tables are not shown in FIG. 16.

Prior art bolometers used exotic materials and construction details which led to low yield in manufacturing, and further high unit cost. Unlike the prior art, construction of a radiant energy imager according to the present invention comprises the steps of fabricating a wafer using a conventional foundry CMOS process, followed by superposition of the microcantilever structures by a conventional MEMS process. Both processes are well understood in the art, and offer high yield and low cost in production.

Although the radiant energy sensor has been here described in terms of a single sensor, it should be understood and emphasized that such sensors are primarily intended to be incorporated within arrays of sensors which, together, form a radiation imager. In the preferred embodiment, the individual sensors are arranged in rows and columns. Each of the plural individual sensors in the array represents a pixel within an image being produced. Using this array configuration results in the advantage of increased resolution for imaging details of objects which vary over a wide dynamic range of radiance.

It should be understood that various other micro-cantilever configurations may be used alternatively. It should be further understood that the methods for forming the micro-cantilever are as known in the art and as described previously.

Although the radiation sensor and switch-time measuring circuitry have been described in conjunction with a single radiation sensor and system, alternative configurations and application will be obvious to those skilled in the art within the scope of the present invention such as applications for a radiation imager consisting of a plurality of such sensors, each coupled to timing circuitry and forming an array from which a visible image may be produced.

In summary, the present invention provides new methods, systems and apparatus for an irradiance sensor including a deflectable conductive micro-cantilever element which curls toward a second conductive element according to the irradiance absorbed; switch contacts between these elements are opened at the beginning of the measurement period by electrostatic repulsion between the elements and closed prior to the end of the measurement period, the time between these switch events being a monotonic measure of the absorbed irradiance. The circuitry associated with each sensor records the value of a quantity monotonically related to said time and thus functions as a recording clock. In an embodiment, plural sensors in an array constitute an imaging focal plane array and the stored clock times are read out to provide a digital data stream to external circuitry designed to normalize and calibrate the data, from which an image is assembled, which image is provided to an external video display.

The preceding description was provided to illustrate the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A repulsive cantilever assembly comprising:
a cantilever having a conductive surface adapted to conduct electrical charges, the cantilever anchored at a first end and suspended at a second end;
a first electrode positioned opposite to and spaced apart from the cantilever conductive surface, the first electrode configured to receive electrical charges of a first polarity, conduct electrical charges and be electrically coupled with the cantilever surface; and
a second electrode spaced apart from the first electrode and configured to receive electrical charges of a second polarity, wherein the cantilever is repulsed from the first electrode when said electrical charges are applied.

2. A cantilever as in claim 1 wherein the electrical charges are supplied from a voltage source.

3. A cantilever as in claim 1 wherein the cantilever, the first electrode and the second electrode surfaces are substantially parallel to each other.

4. A cantilever as in claim 1 wherein the cantilever, the first electrode and the second electrode comprise parallel plates for increasing electrostatic area.

5. A cantilever as in claim 1 wherein the first and second electrodes are stationary.

6. A cantilever as in claim 1 further comprising an insulative support substrate.

7. A cantilever as in claim 6 wherein the first electrode is disposed on the surface of the support substrate.

8. A cantilever as in claim 6 wherein the second electrode is embedded in the support substrate.

9. A cantilever as in claim 6 wherein cantilever is anchored on the support substrate.

10. A sensor for measuring an influence, comprising:
a substrate;
a first element coupled to the substrate at a first end of the first element, a second end of the first element extending over the substrate to form a gap;
a first electrode positioned proximate to the gap and in electrical communication with the first element; and
a second electrode positioned proximate to the first electrode, the first and second electrodes adapted to generate an electrostatic force responsive to a voltage applied to the first and second electrodes, wherein the second end is configured to be displaced in response to the electrostatic force, the second end displaced by an influence that comprises at least one of irradiation, heated air, temperature, acceleration, and mass.

11. A sensor as in claim 10 wherein the first element comprises an absorber plate supported by a bi-material spring with the bi-material spring supported by an insulating member, and wherein the bi-material spring comprises materials having different coefficients of thermal expansion.

12. A sensor as in claim 10 further comprising a contact switch changing state when the cantilever is at a predetermined position, wherein the contact switch contacts the first element when the first element reaches the predetermined position to drain an effect of the influence on the first element.

13. A sensor as in claim 10 wherein the first and second electrodes are further adapted to receive opposite polarity electrical charges from an electrical source, the electrical source comprising a bias voltage in series with a periodic voltage.

14. A sensor as in claim 13 wherein the bias voltage counterbalances characteristic forces of the first element to provide a freely moving first element.

15. A sensor as in claim 13 where the periodic voltage cycle is of a sawtooth form comprising a rapid increase from a resting voltage followed by a gradual return to resting voltage.

16. A sensor as in claim 10 further comprising:
a contact switch changing state when the cantilever is at a predetermined position, wherein the influence is determined from states of the contact switch; and
a measurement circuit to measure the time between changes of the switch states which are a measure of the influence.

17. The sensor of claim 10, further comprising a contact switch changing state when the first element is at a predetermined position.

18. The sensor of claim 17, the second end of the first element configured to move within the gap in response to an influence experienced by the first element, wherein the influence is determined from states of the contact switch.

19. The sensor or claim 17, wherein the second electrode is embedded within the substrate.

20. An irradiance sensor comprising:
a surface electrode;
a first switch terminal;
a cantilever electrically connected to the surface electrode, the cantilever having a first end including a second switch terminal, the second switch terminal configured to contact the first switch terminal at a predetermined position; and
an encapsulated electrode wherein an electrostatic force is generated when a voltage is applied between the encapsulated electrode and the surface electrode,
wherein the position of the first end of the cantilever is responsive to the electrostatic force.

21. A sensor as in claim 20 further comprising an insulative support substrate, wherein the surface electrode and the first switch terminal are disposed on a surface of the support substrate, and wherein the encapsulated electrode is embedded within the support substrate, the cantilever coupled to the support substrate.

22. A sensor as in claim 20 wherein the cantilever comprises an absorber plate supported by a bi-material spring, wherein the bi-material spring is supported by an insulator leg anchored to a support substrate.

23. A sensor as in claim 22 wherein the absorber plate serves to convert irradiation of selected wavelengths to heat.

24. A sensor as in claim 22 wherein the absorber plate comprises a layer of insulator material between contiguous coatings of a conductive metal.

25. A sensor as in claim 22 wherein the absorber plate is made of graphite.

26. A sensor as in claim 22 wherein the absorber plate comprises a coating which absorbs at selected wavelengths.

27. A sensor as in claim 26 wherein the coating has an electrical conductivity in the range from 1 to 10,000 ohm per meter.

28. A sensor as in claim 26 wherein the coating comprises metal black.

29. A sensor as in claim 28 wherein the metal black coating is mechanically strengthened by at least one of diffusion bonding and intra-matrix adsorption of adhesive in vapor form.

30. A sensor as in claim 28 wherein said metal black comprises gold.

31. A sensor as in claim 22 wherein the bi-material spring comprises materials having different coefficients of thermal expansion.

32. A sensor as in claim 31 wherein the material having a low coefficient of thermal expansion is adjacent the surface electrode.

33. A sensor as in claim 31 wherein the material having a high coefficient of thermal expansion is selected from a group consisted of aluminum, zinc, tin and polymer.

34. A sensor as in claim 33 wherein the material having a low coefficient of thermal expansion is selected from a group consisted of silicon dioxide and silicon nitride.

35. A sensor as in claim 20 wherein the thermal time constant of the cantilever is greater than the time between switch opening and switch closure.

36. A sensor as in claim 20 wherein the thermal time constant of the cantilever is greater than the time of exposure during which data is gathered.

37. A sensor as in claim 20 wherein the first switch terminal comprises a thermally conductive material.

38. A sensor as in claim 37 wherein the thermally conductive terminal removes accumulated heat from the cantilever when contacting the second switch terminal.

39. A sensor as in claim 20 wherein the voltage source comprises a bias voltage in series with a periodic voltage.

40. A sensor as in claim 39 wherein the bias voltage counterbalances the bend of the cantilever due to substrate temperature.

41. A sensor as in claim 39 wherein the bias voltage source comprises a constant voltage source in the range of 0-1000V.

42. A sensor as in claim 39 wherein the periodic voltage source comprises a variable voltage source is in the range of 0-50V peak to peak.

43. A sensor as in claim 39 where the periodic voltage cycle is of a sawtooth form comprising a rapid increase from a resting voltage followed by a gradual decline to a resting voltage.

44. A sensor as in claim 43 wherein the gradual decline is a linear decline.

45. A sensor as in claim 43 wherein the gradual decline is a nonlinear decline for compensating for a non linearity of a sensor's response.

46. A sensor as in claim 39 wherein each cycle of the periodic voltage is equal in time length to a single video frame time.

47. A sensor as in claim 46 wherein each cycle of the periodic voltage corresponds with one frame time of 1/60 second.

48. A sensor as in claim 46 wherein the thermal time constant of the cantilever is greater than the length of a single video frame.

49. A sensor as in claim 20 further comprising an electronic sensing circuit coupled to said switch contact and responsive to the closure of said switch contact.

50. A sensor as in claim 49 wherein said electronic sensing circuit response is a measure of the periodic voltage upon first closure of the switch contact.

51. A sensor as in claim 49 wherein said electronic sensing circuit response provides a measure of the time between switch opening and the first subsequent closure of the switch contact.

52. A sensor as in claim 49 wherein said electronic sensing circuit comprises a clock circuit to measure the time interval between switch opening and switch closure.

53. A sensor as in claim 52 where clock circuit comprises an oscillator, a counter and a register latch.

54. An image sensor comprising a plurality of sensors as in claim 20 for imaging a radiation pattern.

55. A plurality of sensors each according to claim 20 arranged in a regular array to form an imaging sensor, with a single electrical source common to all sensors to provide the electrostatic repulsion.

56. An imaging sensor according to claim 55, further comprising an oscillator and a pulse counter common to all sensors to provide a time signal to a register at each sensor, said register being locked upon closure of its sensor switch, to retain the timing count.

57. The sensor of claim 20, wherein the electrostatic force repulses the first end of the cantilever.

58. The sensor of claim 20, wherein the position of the first end of the cantilever is further responsive to irradiance received by the cantilever.

59. A system for recording an image of an irradiation pattern, comprising:
a voltage source; and
a plurality of sensors, each sensor comprising,
a cantilever anchored at a first end and forming a gap at a second end, the position of the second end of the cantilever configured to change in response to irradiation exposure,
a pair of electrodes, wherein a first electrode of the pair of electrodes is electrically coupled to the cantilever, the voltage source configured to apply a voltage across the pair of electrodes, wherein the electrodes generate an electrostatic force configured to change the position of the second end of the cantilever, and
a switch having a first terminal and a second terminal, the first terminal coupled to the cantilever, wherein the switch changes state when the position of the second end of the cantilever changes from a predetermined position; and
a sensing circuit for sensing state signals from the plurality of sensors.

60. A system as in claim 59 further comprising a heater for elevating the temperature of the sensors to permit operation of the sensor array within the limits of electrostatic temperature compensation.

61. A system as in claim 59 further comprising a duplicate sensor shielded from irradiation to provide a substrate temperature.

62. A system as in claim 59 further comprising a video display for receiving the data stream for displaying a corresponding image on the video display.

63. A system as in claim 59 wherein the sensing circuit comprises a readout circuit for extracting the responsive signals from the sensors in a sequence so as to form a data sequence representative of the irradiation image.

64. The system of claim 59, wherein the second end of the cantilever is configured to be predictably moved using the electrostatic force.

65. The system of claim 59, wherein accumulated heat on the cantilever is removed through thermal conduction when the first terminal and second terminal are in contact.

66. A method for measuring an influence, comprising:
configuring a portion of a cantilever to change position in a first direction in response to an exposure to an influence;
applying an electrical voltage to a pair of electrodes to generate an electrostatic force on the cantilever, wherein the electrostatic force is in a second direction which differs from the first direction; and
detecting when the portion of the cantilever is at a predetermined position in response to influence exposure.

67. A method as in claim 66 wherein the influence heats the cantilever to bend the cantilever.

68. A method as in claim 66 further including draining the effect of the influence on the cantilever when the cantilever reaches the predetermined position, wherein draining includes draining the thermal energy from the cantilever.

69. A method as in claim 66 wherein applying an electrical voltage comprises:
applying a voltage step to bend the cantilever arm from the predetermined position;
decreasing the voltage steadily to adjust the bending response of the cantilever by the influence.

70. A method as in claim 66 wherein applying an electrical voltage comprises applying a steady bias voltage to adjust the pressure on the cantilever.

71. A method as in claim 70 wherein applying an electrical voltage further comprises applying a sawtooth waveform voltage.

72. A method as in claim 71 further comprising
adjusting the sawtooth waveform to achieve a predetermined sensitivity response of the cantilever arm.

73. A method as in claim 66 wherein detecting further comprises measuring a voltage across a switch when the cantilever reaches the predetermined position.

74. A method as in claim 66 wherein detecting further comprises collecting the elapsed time between opening and closing time of the switch to determine the influence.

75. A method as in claim 66 wherein detecting further comprises counting cycles from an external oscillator, the sum of which cycles counted between switch opening and closing is representative of the irradiance.

76. A method as in claim 66 further comprising correcting a signal with a look-up table.

77. A method as in claim 76 wherein the look-up table compensates for variations in sensor sensitivity.

78. A method as in claim 76 wherein the look-up table converts the signal to a selected mathematical representation of image irradiance.

79. The method of claim 66, wherein the second direction is opposite to the first direction.

80. The method of claim 66, wherein the cantilever is configured to absorb energy in response to influence exposure, the method further comprising releasing the absorbed energy when the cantilever reaches the predetermined position.

* * * * *

UNITED STATES PATENT AND TRADEMARK OFFICE
CERTIFICATE OF CORRECTION

| | | |
|---|---|---|
| PATENT NO. | : 7,977,635 B2 | Page 1 of 1 |
| APPLICATION NO. | : 12/189134 | |
| DATED | : July 12, 2011 | |
| INVENTOR(S) | : Oliver Edwards | |

It is certified that error appears in the above-identified patent and that said Letters Patent is hereby corrected as shown below:

Delete the word "or" at column 23, line 20, in claim 19 and replace it with the word "of".

Signed and Sealed this
Twentieth Day of March, 2012

David J. Kappos
*Director of the United States Patent and Trademark Office*